(12) United States Patent
Gregory et al.

(10) Patent No.: US 7,472,502 B2
(45) Date of Patent: Jan. 6, 2009

(54) APPARATUS FOR TERMINATION OF A WIRE ROPE USED FOR MINING EQUIPMENT

(76) Inventors: George Robert Gregory, P.O. Box 8572, Tyler, TX (US) 75711; Robert McClure Love, III, P.O. Box 8572, Tyler, TX (US) 75711

( * ) Notice: Subject to any disclaimer, the term of this patent is extended or adjusted under 35 U.S.C. 154(b) by 95 days.

(21) Appl. No.: 11/107,636

(22) Filed: Apr. 14, 2005

(65) Prior Publication Data
US 2005/0251972 A1   Nov. 17, 2005

Related U.S. Application Data

(60) Provisional application No. 60/562,432, filed on Apr. 14, 2004.

(51) Int. Cl.
*E02F 3/58* (2006.01)
(52) U.S. Cl. .......................................... 37/397; 37/399
(58) Field of Classification Search .................. 37/395, 37/396, 397, 398, 399, 455; 294/38.27, 68.27
See application file for complete search history.

(56) References Cited

U.S. PATENT DOCUMENTS

| 1,379,311 | A | * | 5/1921 | Page ............................ 37/399 |
| 3,775,811 | A | * | 12/1973 | Smrekar et al. ............ 24/122.6 |
| 4,066,368 | A | * | 1/1978 | Mastalski et al. .......... 24/122.6 |
| 4,845,814 | A | * | 7/1989 | Crook ....................... 24/136 R |
| 5,367,798 | A | * | 11/1994 | Hughes ......................... 37/399 |
| 6,733,203 | B2 | * | 5/2004 | Carlsen et al. .............. 403/365 |
| 7,231,956 | B2 | * | 6/2007 | Gregory et al. ............... 164/54 |
| 7,231,957 | B2 | * | 6/2007 | Gregory et al. ............... 164/54 |
| 2005/0230075 | A1 | * | 10/2005 | Gregory et al. ............... 164/54 |
| 2005/0230076 | A1 | * | 10/2005 | Gregory et al. ............... 164/54 |
| 2007/0119562 | A1 | * | 5/2007 | Gregory et al. ............... 164/54 |

* cited by examiner

*Primary Examiner*—Gary S Hartmann
(74) *Attorney, Agent, or Firm*—Shultz & Associates, P.C.

(57) ABSTRACT

An apparatus and method for connecting a mining dump bucket to a set of drag chains and a set of dump ropes is provided. A metallic nugget is fused to a drag rope. The metallic nugget is then inserted into a novel coupler or socket attached to a dump bucket. Also provided is a set of frustoconical wedges adjacent the nugget and a frustoconical receiver used to secure the rope to the coupler or socket.

12 Claims, 6 Drawing Sheets

APPARATUS FOR TERMINATION OF A WIRE ROPE USED FOR MINING EQUIPMENT

CROSS-REFERENCE TO RELATED APPLICATION

This application claims priority to U.S. Provisional Application Ser. No. 60/562,432 filed Apr. 14, 2004, entitled "Termination on a Wire Rope Formed from Exothermic Metallic Material or Liquid Adhesives."

FIELD OF THE INVENTION

The present invention relates to an apparatus and method for terminating a wire rope and connecting it to various pieces of equipment. In a preferred embodiment, the termination is used in association with a dump bucket or socket in the field of mining.

BACKGROUND OF THE INVENTION

Methods for forming wire terminations and connections are taught in U.S. Pat. No. 6,170,145 to Lucas, U.S. Pat. No. 6,035,692 to Lucas; U.S. Pat. No. 2,151,032 to Jensen, U.S. Pat. No. 6,156,975 to Roose, U.S. Pat. No. 5,499,448 to Tournier, U.S. Pat. No. 3,844,601 to Rochester, U.S. Pat. No. 2,038,535 to Brenizer, Campbell U.S. Patent Publication No. 2004/0093714, Gloaguen U.S. Patent Publication No. 2004/0121658 and Fujiwara U.S. Patent Publication No. 2002/0162683.

A need has existed for a wire rope termination made by a fast process resulting in a light-weight, heavy duty termination. A further need has existed for connecting wire rope terminations to mining and other equipment quickly and safely. For example, for connecting to mining rigging, such as a dragline bucket rigging for open pit mining or operations in other industries. A further need has existed for a method to create wire rope terminations which result in great strength. The present invention meets these needs.

BRIEF DESCRIPTION OF THE DRAWINGS

In the detailed description of the preferred embodiments presented below, reference is made to the accompanying drawings.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that the embodiments can be practiced or carried out in various ways.

The invention relates to a method for making terminations on wire rope for use on dragline buckets, or similar earth relocating components.

The termination described herein is made by a labor saving process for use with mining equipment. The termination for wire rope is lighter than conventional terminations used on drag lines in the mining industry, but has the same or greater strength.

The couplers for wire rope for the mining industry must be capable of sustaining a large break force. The coupler of the present invention weighs appreciably less than similarly sized wire ropes with typical couplers, up to or exceeding 50% less. For example, a current style coupler could weigh 6000 pounds for a 4-⅜ inch diameter wire rope. In contrast certain embodiments of the invention utilize a coupler weighing only about 1500-2800 pounds for the same diameter wire rope. In the preferred embodiment, the terminations are for use with wire ropes with a diameter between 4 inches and 7 inches. The terminations will work equally well with smaller and larger diameter wire rope. Typical wire ropes are made of steel, alloys of steel and combinations thereof. The wire rope can be a single strand rope or a multi-strand rope.

Figure 1:
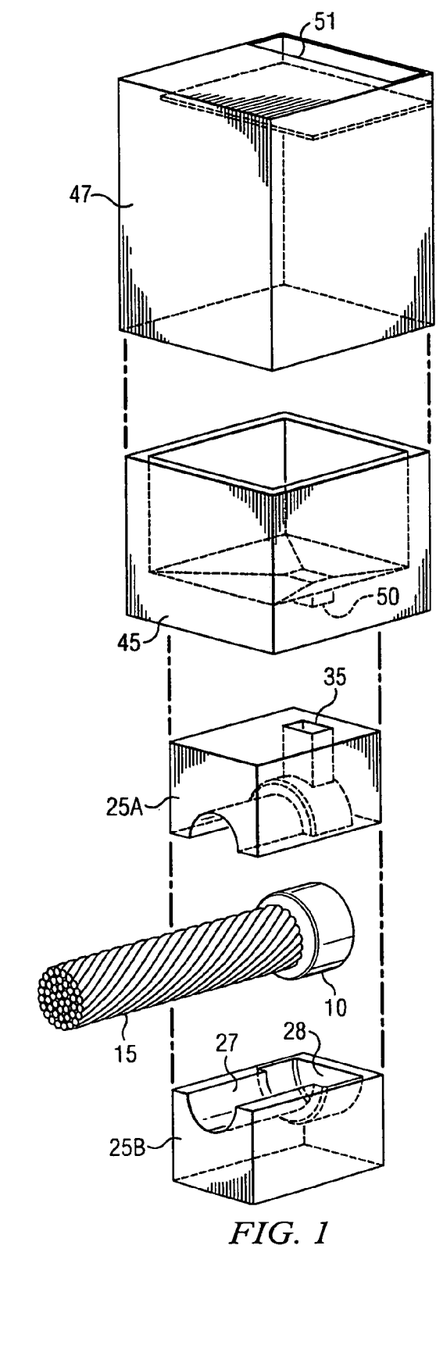
FIG. 1 depicts an exploded isometric view of the apparatus used in the method for making a termination for a wire rope using an exothermic metallic material.

The terminations are made using the equipment of FIG. 1. In a first embodiment, the termination 10 is formed on the end of a wire rope 15 using an exothermic metallic material. In an alternative embodiment, a liquid adhesive can be used to make the termination for the wire rope. The termination formed from the liquid adhesive has additional safety advantages as the termination can be made without heat in the field, preventing burns to workers, which is a much needed benefit.

For terminations made using the exothermic metallic material, one end of the wire rope is inserted into a mold 25. FIG. 1 depicts the mold 25 as a two part mold with a top part 25a and a bottom part 25b, but a one piece mold can also be used. For large diameter wire ropes, a three piece mold may be used. In this embodiment, the top half of the mold is segmented along the axis of the wire rope opening 27. For extremely large diameter ropes, a several piece mold may be used.

The pieces of mold 25 are held together with toggle-type latches (not shown) spaced around the periphery of the mold. In the preferred embodiment, using two pieces for the mold, there are four latches, two on each side. For the preferred embodiment where the mold is made in three pieces, six latches are used, two on each side and two on the top to hold the top two pieces of the top section of the mold together. The latches are placed so that leakage of molten metal between the seams of the pieces of the mold and down the access of the wire rope is minimized or preferably prevented.

The mold has a mold opening 35. The mold opening can be rectangular, but an elliptical shape or round shape or other shape can be used. The opening should have a diameter that is adequate to permit molten metal to flow into the mold.

The mold has a cavity formed with two connected chambers, a wire rope opening 27 and a termination cavity 28. Wire rope opening 27 is cylindrical and formed to the diameter of the wire rope. Termination cavity 28 in the preferred embodiment is also cylindrical having a diameter approximately two inches greater than the diameter of wire rope 15. The dimensions of the termination cavity are a matter of design choice. In the preferred embodiment of a termination cavity for a 4½-inch diameter wire rope, the cavity is 7¾ inches in diameter and 4 inches long The termination cavity can have a conical, cylindrical, or even rectangular shape. The cavity dictates the resultant shape of the termination. For example, the termination can include a hole perpendicular to the axis of the wire rope form or form a particular shape for connection to other equipment dependent on the shape of the termination cavity.

The external shape of the mold can be any functional shape but is preferably rectangular. The overall external dimensions of the mold of a preferred embodiment are between about 6 inches and about 20 inches; 10 inches is a preferred example. The width of the mold of a preferred embodiment can range from about 6 to about 16 inches; 8 inches is a preferred example. The length of a preferred embodiment can range from about 8 to about 24 inches; 12 inches is a preferred example.

The mold is preferably made of graphite or other materials that are very heat resistant.

Figure 2:
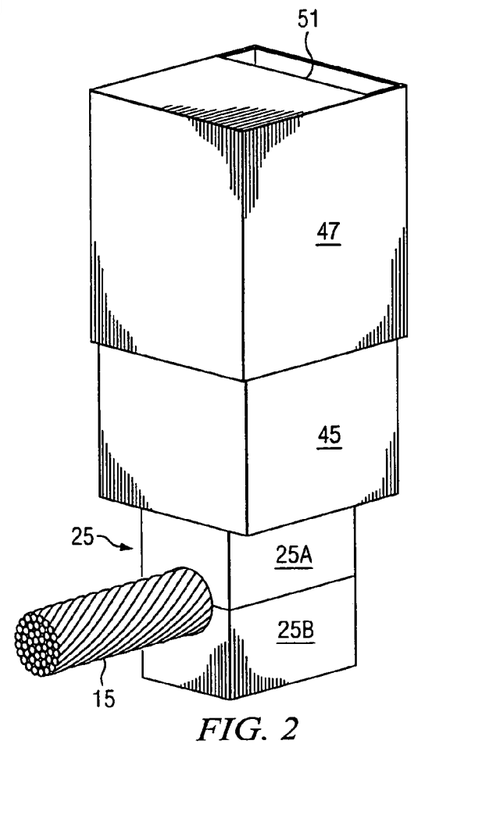
FIG. 2 depicts an isometric view of the apparatus used in the method.

FIG. 2 shows an isometric view of wire rope 15 inserted into mold 25. FIG. 2 also shows a crucible 45, baffle 47 and baffle opening 51.

Figure 3:
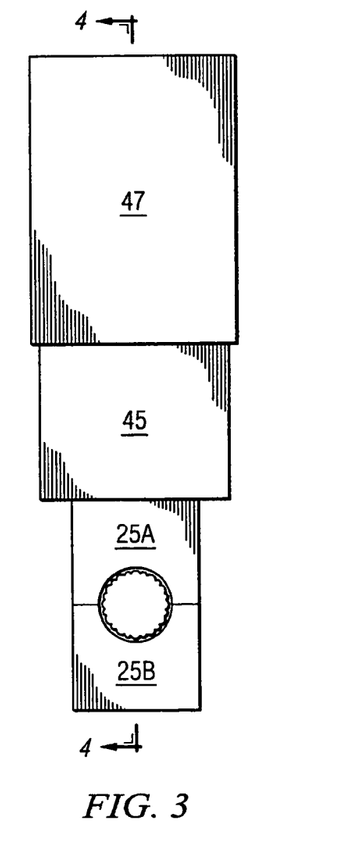
FIG. 3 depicts a front view of the assembled apparatus used in the method.

FIG. 3 shows a front view of baffle 47 and crucible 45 with the mold 25 and a preferable circular opening for engaging the wire rope.

Figure 4:
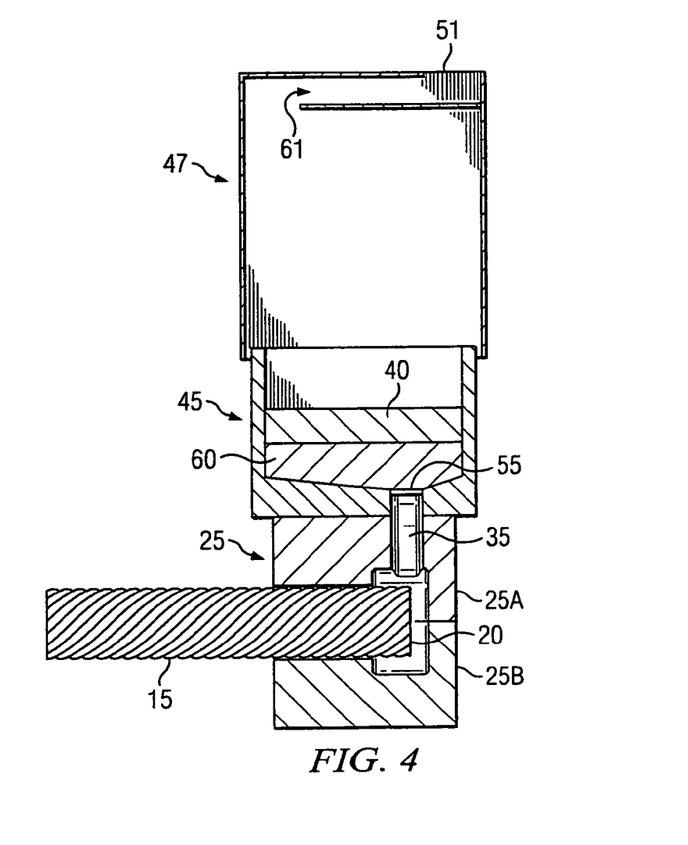
FIG. 4 depicts a cross-sectional side view of the assembled apparatus used in the method.

FIG. 4 depicts a cross-sectional view of the mold, crucible and wire rope.

The crucible provides a reaction chamber for the exothermic material. The crucible dimensions preferably coincide with or are slightly larger than the dimensions of the mold. The dimensions of the crucible of a preferred embodiment are between 10 and 18 inches in height (preferably 12 inches), between 10 and 20 inches in width (preferably 14.5 inches), and between 10 and 30 inches in length (preferably 15 inches). In the preferred embodiment, the walls of the crucible are one inch thick. The floor of the crucible is angled to assist the molten metal flowing out of the crucible through crucible opening 50. The crucible can have a cylindrical shape, a rectangular shape, but generally it is hollow to receive material. The crucible opening has a shape that can be rectangular, ellipsoid, or another usable shape for flowing molten metal into the crucible. The crucible is preferably made of graphite or a heat resistant material that will not deform in the presence of high heat.

A separator 55 is disposed over the crucible opening 50. The purpose of the separator is to keep the exothermic metallic material separate from the mold until ignition of the exothermic metallic material. Typically, separator 55 is a mild steel material; however, any sacrificial material can be used. In a preferred embodiment, the separator has a width between 2 inches and 6 inches in width and a length between 4 inches and 8 inches with a thickness that can range in a corresponding manner. In a preferred embodiment, the thickness of the separator is 10 gauge.

The terminations are made using an exothermic metallic material 40 that is placed into the crucible. The exothermic metallic material is preferably a powdered metallic material. Examples of usable powdered metals include aluminum, copper, tin, alloys of aluminum and alloys of copper, oxides of these metals, particularly including copper oxide. The material can be granules, a powder, or small metal chips. Different sizes of granules, powder or small metal chips can be used in the same crucible. In the preferred embodiment, the material is provided in two phases. The first phase has a fine granularity to promote ease of ignition. The second phase has a coarse granularity to slow burning of the material and provide for adequate bulk to sustain the reaction. In the preferred embodiment, the first phase has granules of approximately 1/100 of an inch in diameter and the second phase granules have the size of approximately 1/10 an inch in diameter. In the preferred embodiment, the exothermic metallic material is sold under the trademark "Cad Weld", available from ERICO, Inc. of Solom, Ohio.

A baffle 47 is inserted over the crucible 45 to contain the heat and direct any resulting vapors out a baffle opening 51. The baffle is preferably the same of similar shape to that of the crucible. The baffle is preferably made from steel plate. As shown in FIG. 4, the baffle 47 has at least one internal baffle 61 for deflecting the heat and hot reaction gasses from the crucible.

In a preferred embodiment, the baffle can have a length ranging between 11 inches to 31 inches, a width ranging between 11 inches to 21 inches, and a height ranging between 11 inches to 19 inches in length. The preferred dimensions are 16 inches in length, 15 inches in width, and 18 inches in height. The preferred thickness of the baffle is 10 gauge.

The process of making a termination in the preferred embodiment begins by clamping the mold together by closing the appropriate toggle clamps. Crucible 45 and baffle 47 are then appropriately assembled. Assembly requires insertion of separator 55 in between crucible 45 and termination cavity 28. Crucible 45 and mold 25 must be positioned so that ducted communication, through separator 55 is achieved.

In the preferred embodiment, the end of wire rope 20 is cleaned before the termination is formed. The cleaning step can be performed by any normal means of cleaning a substance. The preferred methods for cleaning are either by using a torch, by using chemicals to remove dirt, and combinations thereof.

After cleaning, wire rope 15 is inserted into wire rope opening 27 far enough to extend into termination cavity 28. In the preferred embodiment of the method, the wire rope is extended approximately two thirds of the width of termination cavity 28.

Exothermic metallic material 40 is then added to crucible 45 in at least one phase. When additional phases of exothermic metallic material 40 are desired in crucible 45, the bulk phases are added first and allowed to settle. The fine phases are then added and allowed to settle.

The exothermic metallic material 40 is kindled in the crucible 45. The exothermic metallic material 40 can be kindled using a striker, a torch, a flame, or other similar heat sources, and combinations thereof. Once kindled, the exothermic metallic material 40 burns very hot and very fast. The exothermic metallic material forms a ductile and malleable material and liquefies the separator 55 forming a molten material 60.

Molten material 60 flows into mold 25 through mold opening 35 and comes into contact with end 20 of wire rope 15. Molten material 60 is of such a temperature that is partially melts and fuses to the wire rope. Molten material 60 takes the form of mold 25 around end 20 forming termination 10.

Molten material 60 is allowed to cool which in the preferred embodiment can take approximately 15 minutes. Crucible 45 and baffle 47 are then removed from mold 25. Mold 25 is then separated into pieces by disconnecting the latches which hold the pieces of the mold together. If the mold is a single piece, it may need to be broken away from the termination. In cooling, exothermic material 60 slightly contracts, allowing the pieces of the mold to be removed easily.

The resultant termination 10 is lighter than conventional terminations and is typically capable of sustaining a higher break force than the wire rope.

A termination according to the present invention may be made using a liquid adhesive.

If the termination is formed using a liquid adhesive, the wire rope first end is place in a mold. A liquid adhesive is then poured into the mold 25 through the mold opening 35 covering the end of the wire rope. The liquid adhesive may need to be heated to room temperature if the method is performed in a cold climate. Examples of usable liquid adhesives include an epoxy, such as a Devcon™ aluminum epoxies from Illinois Tool Work, of Devcon, Ill. Epoxies from 3-M of Minneapolis, Minn. are also contemplated as usable herein, as well as other epoxies that are strong and bond to steel.

The liquid adhesive is allowed to cure in the mold 25 forming a cured termination typically capable of sustaining a higher break force than the wire rope.

In the preferred embodiment the formed termination is inserted into a socket. The socket has an equipment connector on one end adapted to engage mining equipment and a wire rope connector on the other end adapted to engage the termination. Of course, the termination provided by the preferred embodiments of the invention does not necessarily need to be inserted into a socket to operate and is useful by itself in other applications which do not require a socket.

Figure 5:
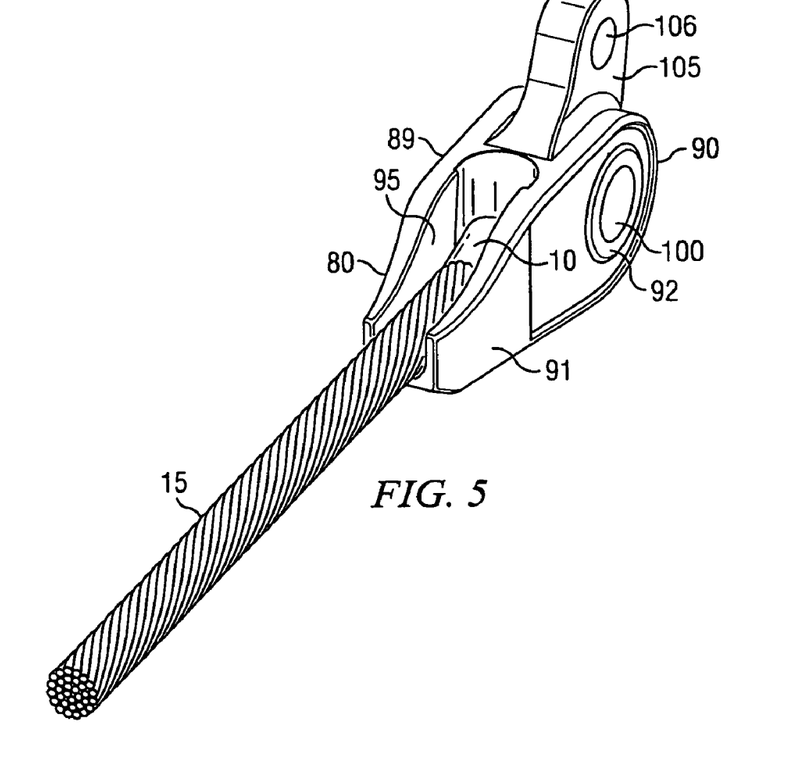
FIG. 5 depicts a perspective view of a socket usable with the termination.

FIG. 5 shows the wire rope with termination engaging a socket 89. The socket has a first connector end 90 adapted to engage mining equipment; and a second connector end 80 to engage the termination 10 on wire rope 15. First connector end 90 includes hole 92, connector 105 and connector hole 106. Hole 92 is sized to include a bushing 100 for connection to mining equipment. Connector hole 106 is similarly sized for connection to the mining equipment. Second connector end 80 includes an upward facing opening 95 which is sized to permit an insertion of wire rope 15 and termination 10.

Socket 89 is preferably formed from ANSI 4140 steel or EN30B material. The dimensions of socket 89 are a matter of engineering choice. However, in the preferred embodiment for a wire rope of 4½ inch diameter, socket 117 is approximately 35 inches long and 13¼ inches wide.

Figure 6A:
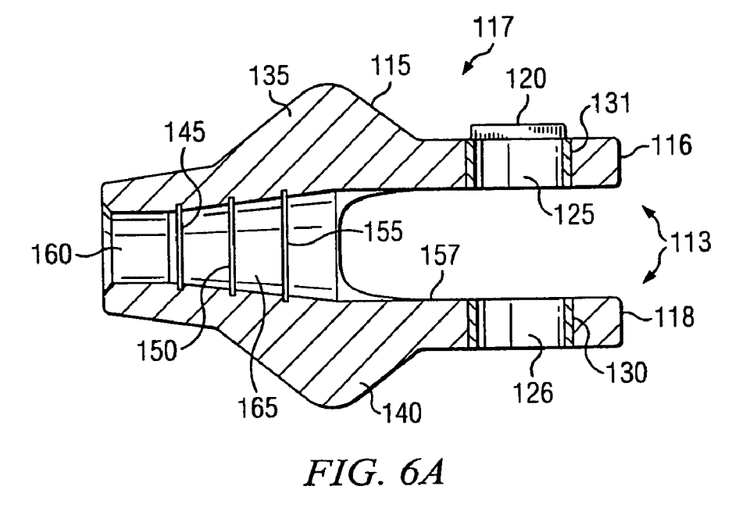
FIG. 6a is a cutaway plan view of an alternate embodiment of a socket usable with the termination.

Moving to FIG. 6a, an alternate embodiment of a socket is shown as socket 117. Socket 117 has body 115. In the preferred embodiment, body 115 is formed from ANSI 4140 steel or EN30B material. First connector end 113 comprises socket ear 116 and socket ear 118 which are used for connection to mining equipment. Socket ear 116 includes hole 125. Similarly, socket ear 118 includes hole 130. Copper alloy bushing 131 is placed in hole 125. Similarly, copper alloy bushing 130 is placed in hole 126. The size and composition of the bushings are a matter of engineering choice.

Body 115 includes ear support 135 and ear support 140. Ear support 135 and ear support 140 strengthen body 115 to prevent spreading of the ears during operation. Guide set 120 is used during operation of the mining equipment to locate a connector (not shown) during operation. The inclusion of the ear supports and guide set are optional depending on the forces applied to the system and connection pins used in operation.

Body 115 includes a bore 160 opening into frustoconical bore 165. Bore 160 is approximately the same diameter as wire rope 15. Frustoconical bore 165 includes circumferential slots 145, 150 and 155. The circumferential slots allow for lubrication of the frustoconical wedges (not yet shown). The inclusion of the circumferential slots is optional.

Body 115 further includes lateral opening 157. Lateral opening 157 is sized to allow entry and exit of the termination.

Figure 6B:
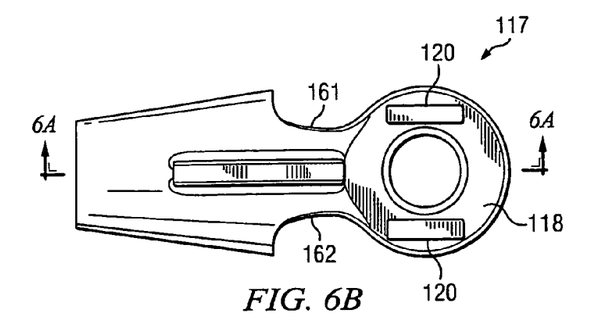
FIG. 6b depicts a side view of an alternate embodiment of a socket usable with the termination.

FIG. 6b shows cradles 161 and 162 formed in body 115 of socket 117. The cradles are provided in the preferred embodiment to reduce weight and are optional.

Figure 7:
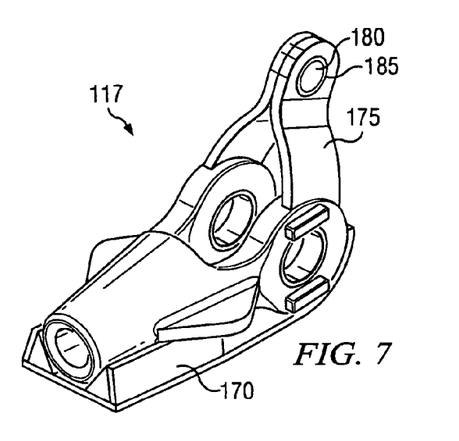
FIG. 7 depicts an isometric view of an alternate embodiment of a socket usable with the termination.

FIG. 7 shows alternate embodiment of the socket for the termination, socket 117. Socket 117 includes upward connector 175 for connection to mining equipment. Upward connector 175 includes through hole 180 and bushing 185. Socket 117 also includes sled 170. In the preferred embodiment, sled 170 is welded to socket 117 to protect the socket and its internal pieces from the elements during mining operations.

Figure 8A:
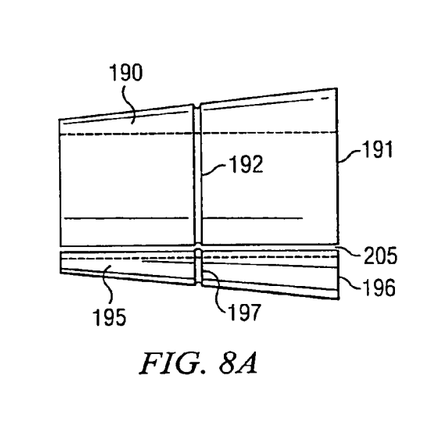
FIG. 8a depicts a side view of two frustoconical wedges usable with the socket of the present invention.
Figure 8B:
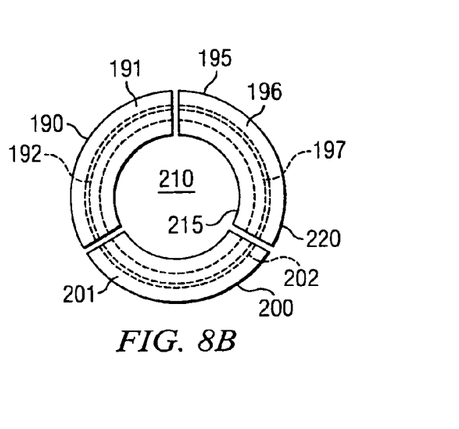
FIG. 8b depicts a plan view of three frustoconical wedges used with the termination of the present invention.

FIGS. 8a and 8b show frustoconical wedges 190, 195 and 200. The frustoconical wedges are designed to fit into frustoconical bore 165 and around wire rope 15. Frustoconical wedge 190 includes surface slot 192. Similarly, frustoconical wedge (195) includes surface slot 197 and frustoconical wedge 200 includes surface slot 202. The surface slots are provided to allow a circular retaining tie to be applied to the frustoconical wedges to hold them together around wire rope 15 during insertion into frustoconical bore 165.

In the preferred embodiment, of frustoconical wedges for use with a 4½ inch wire rope, each frustoconical wedge is 8⅝ inches long and has an outer diameter of 5⅞ inches and an inner diameter of 3⅛ inches. Frustoconical wedge 190 also includes generally flat mating surface 191, similarly, frustoconical wedge 195 has generally flat mating surface 196 and frustoconical wedge 200 has generally flat mating surface 201. Each of the mating surfaces is designed to contact the generally flat mating surface of the termination during operation of the invention.

FIG. 8b shows that the three frustoconical wedges of the preferred embodiment are equal in size, being separated by gaps at 120 degrees. For example, gap 205 separates frustoconical wedge 190 and frustoconical wedge 195 when inserted into frustoconical bore 165. The gaps allow for radial contraction of each frustoconical wedge toward the other frustoconical wedges toward the wire rope during operation of the invention. Gap 205 is typically ⅜ of an inch. In the preferred embodiment, there are three equally spaced and identical frustoconical wedges. However, in alternate embodiments, there can be two or more frustoconical wedges divided axially to provide compression forces to wire rope 15.

In the preferred embodiment, the angle of inclination of the frustoconical wedges is about 96 degrees plus or minus 5 degrees. Of course, other angles of inclination will function according to engineering choice.

Each of the dimensions of the frustoconical wedges, gaps and slots can differ, depending on the size of the wire rope and the frustoconical bore. Each of the frustoconical wedges are preferably made of mild steel or an aluminum ally.

Figure 9A:
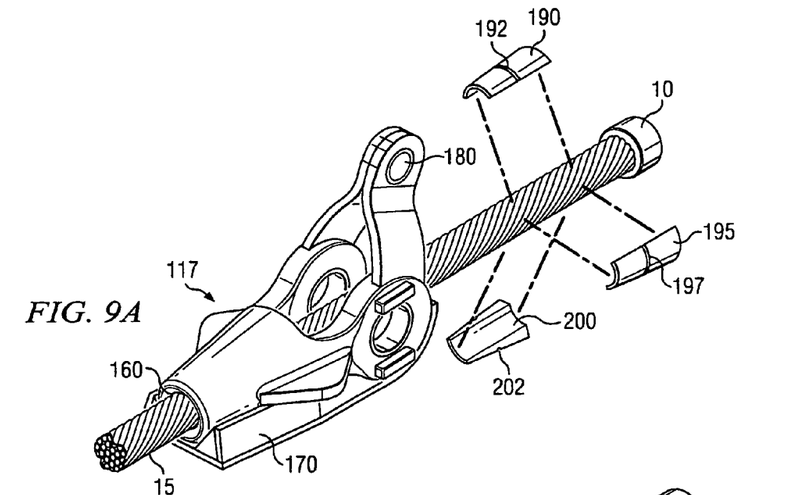
FIG. 9a depicts an isometric assembly view of a wire rope, termination, several frustoconical wedges and a socket.
Figures 9B, 9C:
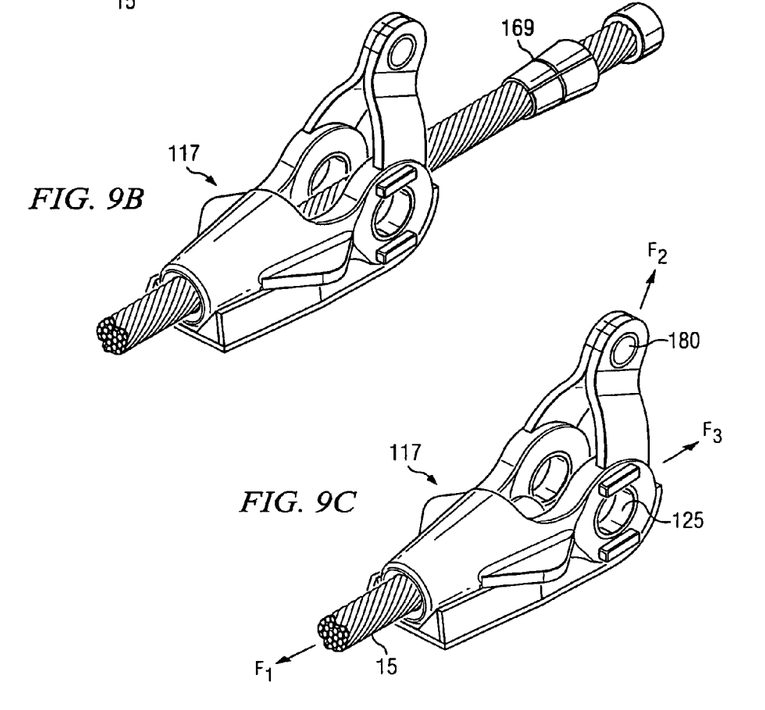
FIG. 9b represents an isometric partially assembled assembly view of a wire rope, termination, several frustoconical wedges and a socket.
FIG. 9c represents an isometric partially assembled view of a termination, socket and wire rope.

Turning to FIGS. 9a, 9b and 9c, the assembly and usage of the termination, frustoconical wedges and socket can be seen.

FIG. 9 shows an exploded view of socket 117, wire rope 15 and termination 10, as well as frustoconical wedges 190, 195 and 200. In operation, wire rope 15 is threaded through bore 160 in socket 117. Termination 10 is then formed on wire rope 15 as previously described.

Frustoconical wedges 190, 195 and 200 are then assembled onto wire rope 15 as shown in FIG. 9b. A circular retaining tie 169 is then fitted into the surface slots to hold the frustoconical wedges in place on the wire rope. If desired, lubrication is placed in circumferential slots 145, 150 and 155. The wire rope, frustoconical wedges and termination are then pulled into socket 117. The termination seats on mating surfaces 191, 196 and 202 on frustoconical wedges 190, 195 and 200, respectively. In turn, the frustoconical wedges seat inside frustoconical bore 165.

FIG. 9c shows the forces applied to wire rope 15 and socket 117 during operation. Force (F1) is applied axially along the wire rope resisted by force (F3) applied to through hole 125. A lifting force (F2) is then applied to hole 180 resulting in lifting and pulling of mining equipment. Force (F2) and (F3) are resisted by a combination of the friction on the wire rope resulting from the inward radial pressure of the frustoconical wedges on the wire rope. In turn, the inward radial pressure is created by the force (F1) acting through the contact between the termination and the mating surfaces of the frustoconical wedges. As force (F1) is increased, the radial pressure on the wire rope is also increased.

Figure 10:
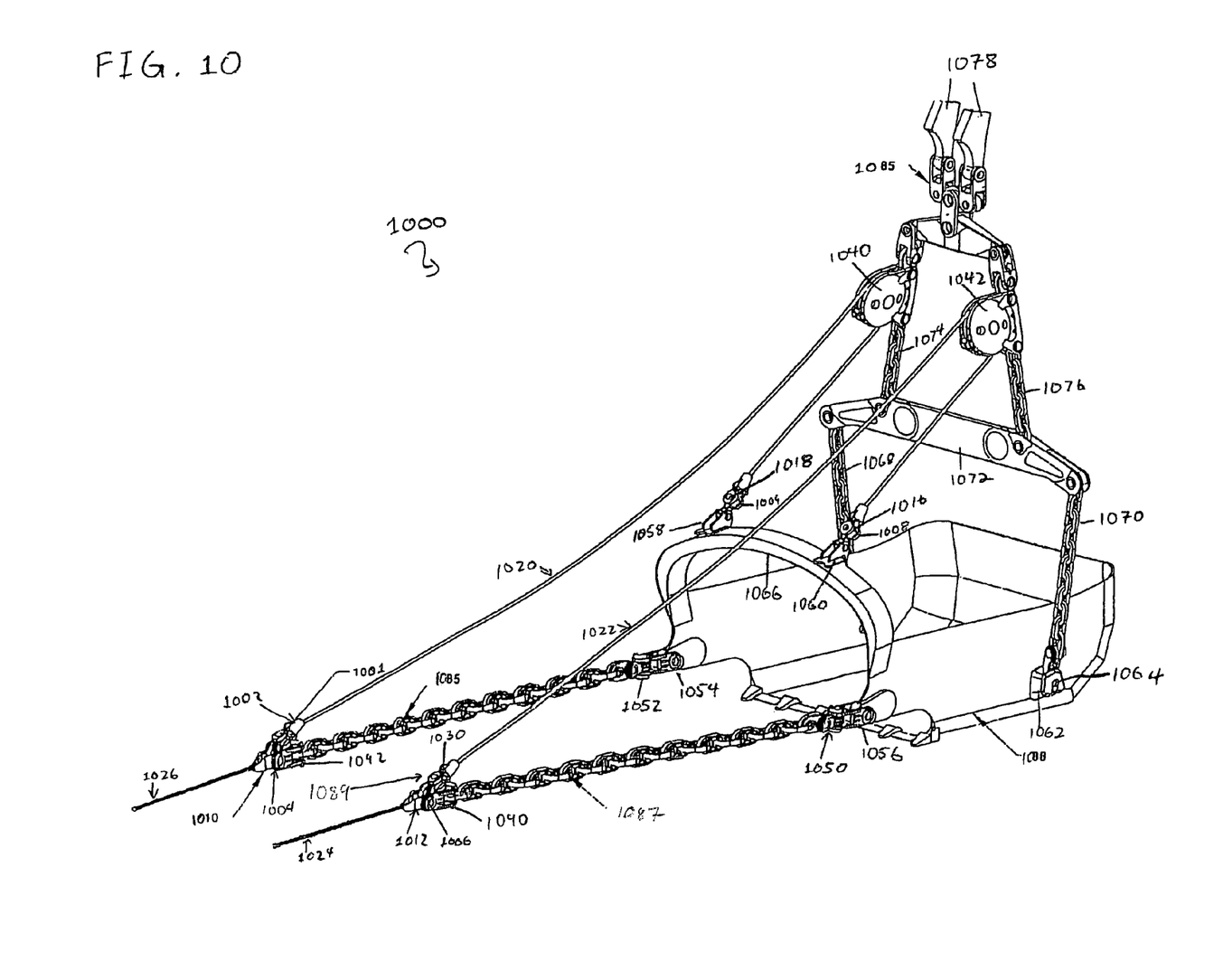
FIG. 10 depicts a mining system employing the wire rope termination

FIG. 10 depicts a mining system 1000 employing the wire rope termination that can be used with excavation equipment of various types, particularly draglines for earth moving mining equipment. The mining system 1000 utilizes wire ropes with a diameter between ¼ inches and 7 inches. The wire rope can be a single or multi-stranded and are made of steels, alloys of steel or combinations thereof.

In the mining system 1000, termination 1001 is disposed on one end of dump rope 1020 as shown. Termination 1001 is engaged with dump rope socket 1002. Dump rope socket 1002 connects to a bucket rigging device thru drag rope socket 1004. Sockets such as those generally shown in FIG. 5 and FIG. 7 or any other sockets known to be compatible in the art may be used as a dump rope socket or a drag rope socket.

Referring to the socket of FIG. 7 as an example, drag rope socket 1004 has ears 118 and bushing 185 with a hole 180. The sockets are connected in operation by aligning the ears of the dump rope sockets 1002 with the hole of the bushing of the drag rope socket 1004. When the three holes are aligned, a throughpin is inserted to connect the ears of the dump rope socket 1002 to the upper hole in the bushing of the drag rope socket.

Drag rope socket 1004 is connected to drag rope 1026 with a termination 1010. A drag rope link 1092 connected to drag rope socket 1004 links the socket to drag chain 1085. On the other end of drag chain 1085, drag hitch link 1052 connects chain 1085 to drag hitch 1054. Drag hitch 1054 is mounted to mining bucket 1088.

A mirror opposite of the above is also depicted in FIG. 10. Termination 1030 is disposed on one end of dump rope 1022. Termination 1030 is engaged with dump rope socket 1089. Dump rope socket 1089 connects to a bucket rigging device thru drag rope socket 1006. Similarly, dump rope socket 1089 connects to drag rope socket 1006 by aligning the ears of the dump rope socket 1089 to a hole in the bushing of drag rope socket 1006.

Dump ropes 1020 and 1022 also have terminations 1018 and 1016 engaged with arch anchor sockets 1009 and 1008. Arch anchor sockets 1009 and 1008 are connected to arch anchors 1058 and 1060. Arch anchors 1058 and 1060 are mounted on arch 1066. Arch 1066 is attached to the upper outside corners of mining bucket 1088. In a preferred embodiment, arch 1060 is welded to mining bucket 1088.

Attached to mining bucket 1088 is a trunion 1062. Trunion 1062 has a trunion pin 1062 inserted in the trunion 1062 which allows for rotation of mining bucket 1088. A second trunion and trunion pin are located on the opposite side of mining bucket 1088. Trunion 1062 connects to lower hoist chain 1070. Similarly lower hoist chain 1068 is connected to a trunion on the opposite side of mining bucket 1088. Lower hoist chains 1068 and 1070 are connected to spreader bar 1072. Also connected to spreader bar 1072 are upper hoist chains 1074 and 1076. Mounted on upper hoist chains 1040 and 1042 are dump sheaves 1040 and 1042.

Dump sheaves 1040 and 1042 are pulleys through which the dump ropes 1020 and 1022 are threaded. Connected at the other ends of the upper hoist chains 1040 and 1042 is a hoist rigging cluster 1085. Hoist rigging cluster 1085 may vary significantly in design. Hoist ropes are freely connected to hoist rigging cluster 1078. Hoist ropes 1078 typically connect to a crane used in the operation of the mining system.

In exemplary embodiments, the mining bucket is used for dirt or ore. In the preferred embodiment, the mining system is suspended from a crane by the hoist ropes 1078. In operation of the mining system, the mining bucket is lowered near or set on the surface to be mined. The crane exerts a pulling force on the drag ropes which in turn pull the drag chains and the mining bucket. This process sets out to cause dirt or ore or any other materials to be collected from the surface. Once the mining bucket has collected the substances to be mined, an upward force is exerted by the crane at the hoist ropes which elevates the rear portion of the mining bucket. Simultaneously, a pulling force is exerted on the drag ropes. As the tension on the drag rope increases, the tension in the dump rope will increase resulting in the elevation of the front of the mining bucket. By increasing the elevation of the front, the collected substances are trapped in the mining bucket. Since, tension in the dump rope and its termination increases as elevation of the mining bucket is increased, frustoconical wedges are used to reduce tension. In a preferred embodiment, the elevation of the front of the mining bucket is approximately 26 degrees.

The mining bucket is dumped out by decreasing the force on the drag ropes which causes the tension in the dump ropes to decrease. This process subsequently lowers the front of the mining bucket and releases the contents of the bucket. The mining bucket is returned to its original mining position by releasing the tension in the hoist ropes and drag ropes.

The embodiments have been described in detail with particular reference to certain preferred embodiments thereof, but it will be understood that variations and modifications can be effected within the scope of the embodiments, especially to those skilled in the art.

The invention claimed is:

1. A subassembly system for connecting an excavation mining dump bucket, having a bucket arch, a first drag chain and a second drag chain, a first dump rope and a second dump rope, and a spreader bar subassembly, to a first drag rope, a second drag rope and a hoist rope comprising:
   a first drag socket, having a first drag socket body, a first frustoconical receiving surface in the first drag socket body and a first support sled member, pivotally connected to the first drag chain;
   a second drag socket, having a second drag socket body, a second frustoconical receiving surface in the second drag socket body and a second support sled member, pivotally connected to the second drag chain;

a first metallic wedge nugget, welded to the first drag rope, adjacent the first frustoconical receiving surface and adapted to removeably connect the first drag socket to the first drag rope;

a second metallic nugget, welded to the second drag rope, adjacent the second frustoconical receiving surface and adapted to removeably connect the second drag socket to the second drag rope;

a first dump socket pivotally connected to the first drag socket and the first dump rope;

a second dump socket pivotally connected to the second drag socket and the second dump rope;

a first anchor socket pivotally connected to the bucket arch and to the first dump rope;

a second anchor socket pivotally connected to the bucket arch and to the second dump rope;

the first dump rope connected to the spreader bar subassembly by a first pulley subassembly;

the second dump rope connected to the spreader bar subassembly by a second pulley subassembly; and the hoist rope operably connected to the spreader bar subassembly.

2. The subassembly system of claim 1 wherein the first metallic wedge nugget is a product formed by the process of:

placing a first end of the first drag rope in a mold having a cavity with an entry port;

creating a molten metal in a crucible ductedly connected to the entry port, through an exothermic reaction in the crucible;

flowing the molten metal into the cavity at a temperature sufficient to weld it to a first end of the first drag rope; and removing the first end of the first drag rope from the mold after the molten metal has cooled to create the first metallic wedge nugget.

3. The subassembly of claim 1 further comprising:

a set of conical wedges, each having an insertion end and a generally flat pressure receiving end;

wherein the set of conical wedges is adjacent the first frustoconical receiving surface and the first drag rope; and wherein each generally flat pressure receiving end is adjacent to and held in place by the first metallic wedge nugget.

4. The subassembly system of claim 1 wherein the first drag socket weighs between about 1,500 lbs. and about 2,800 lbs. and the drag rope has a diameter between about 4 inches and about 7 inches.

5. The subassembly system of claim 4 wherein the first dump socket weighs between about 1,500 lbs. and about 2,800 lbs. and the drag rope has a diameter between about 4 inches and about 7 inches.

6. The subassembly system of claim 5 wherein the first anchor socket weighs between about 1,500 lbs. and about 2,800 lbs. and the drag rope has a diameter between about 4 inches and about 7 inches.

7. The subassembly system of claim 1 wherein the first drag socket body further comprises a diametrically opposed set of generally planar triangular strengthening projections formed integrally with the first drag socket body; each having a planar axis generally aligned with an axis of the first frustoconical receiving surface.

8. The subassembly system of claim 1 wherein the first drag socket body further comprises a first receiving slot in ducted communication with the first frustoconical receiving surface and being adapted to allow the first drag rope and the first metallic wedge nugget to pass therethrough and seat adjacent the first frustoconical receiving surface.

9. The subassembly system of claim 1 wherein the first drag socket body is further comprised of a rectangular laterally projecting guide set to locate a connector.

10. The subassembly system of claim 1 wherein the first wedge nugget is formed from a metal alloy including at least one of the group of copper, aluminum and tin.

11. The subassembly system of claim 1 wherein the first dump rope is a steel material and is of a diameter of between about 4 inches and about 7 inches.

12. The subassembly system of claim 3 wherein each of the set of conical wedges has an angle of inclination of about 96 degrees ±5 degrees.

* * * * *